US012555950B1

(12) United States Patent
Elkhatib et al.

(10) Patent No.: US 12,555,950 B1
(45) Date of Patent: Feb. 17, 2026

(54) ELECTRICAL CONNECTOR WITH A SHELL

(71) Applicant: Cinch Connectivity Solutions Inc., Lombard, IL (US)

(72) Inventors: Hecham Elkhatib, Aurora, IL (US); Maurice Sun, Naperville, IL (US)

(73) Assignee: Cinch Connectivity Solutions Inc., Lombard, IL (US)

( * ) Notice: Subject to any disclaimer, the term of this patent is extended or adjusted under 35 U.S.C. 154(b) by 344 days.

(21) Appl. No.: 18/119,246

(22) Filed: Mar. 8, 2023

Related U.S. Application Data

(60) Provisional application No. 63/317,831, filed on Mar. 8, 2022.

(51) Int. Cl.
*H01R 13/633* (2006.01)
*H01R 13/62* (2006.01)
*H01R 13/639* (2006.01)

(52) U.S. Cl.
CPC ....... *H01R 13/6205* (2013.01); *H01R 13/633* (2013.01); *H01R 13/639* (2013.01)

(58) Field of Classification Search
CPC . H01R 13/6205; H01R 13/633; H01R 13/639
See application file for complete search history.

(56) References Cited

U.S. PATENT DOCUMENTS 3,808,577 A * 4/1974 Mathauser ......... H01R 13/6205 439/246
3,810,258 A * 5/1974 Mathauser ......... H01R 13/6205 439/246
4,317,969 A * 3/1982 Riegler .............. H01R 13/6205 200/51.09
5,909,100 A * 6/1999 Watanabe ............. B60L 53/126 320/108
6,561,835 B1 * 5/2003 Hirschberg .......... H05K 7/1452 439/341
7,311,526 B2 * 12/2007 Rohrbach ................. G06F 1/18 439/39
8,123,544 B2 * 2/2012 Kobayashi ......... H01R 13/6275 439/352
8,888,519 B2 * 11/2014 Baumler ............ H01R 13/6315 439/248
9,065,205 B2 * 6/2015 Gao ................... H01R 13/6592
9,780,484 B2 * 10/2017 DiFonzo ................ H01R 43/26
2008/0165982 A1 * 7/2008 Hankey ................... B21C 23/18 381/74
2013/0040470 A1 * 2/2013 Gao ..................... H01R 43/048 29/874
2013/0210244 A1 * 8/2013 DiFonzo ............ H01R 13/6205 439/39

(Continued)

*Primary Examiner* — Abdullah A Riyami
*Assistant Examiner* — Thang H Nguyen
(74) *Attorney, Agent, or Firm* — Leydig, Voit & Mayer, Ltd.; John Augustyn

(57) ABSTRACT

The electrical connector may include a first connector and a second connector which may be used in high temperature applications. In addition, the first connector and second connector may need to be disconnected with a predetermined pull force. In the first embodiment, the connector uses one or more magnets to control the amount of disconnect pull force. In the second embodiment, the connector uses a beam design to control the amount of disconnect pull force.

20 Claims, 15 Drawing Sheets

(56) References Cited

U.S. PATENT DOCUMENTS

| | | | | |
|---|---|---|---|---|
| 2014/0120745 | A1* | 5/2014 | Wang | G06F 1/1632 439/39 |
| 2015/0118868 | A1* | 4/2015 | Choi | H01R 13/6205 439/39 |
| 2017/0338578 | A1* | 11/2017 | Zhang | H01R 13/516 |
| 2024/0235107 | A1* | 7/2024 | Tao | H01R 13/64 |

* cited by examiner

ELECTRICAL CONNECTOR WITH A SHELL

CROSS-REFERENCE TO RELATED APPLICATIONS

This patent application claims the benefit of U.S. Provisional Patent Application No. 63/317,831, filed Mar. 8, 2022, which is incorporated herein by reference.

BACKGROUND OF THE INVENTION

Electrical connectors and cables are used to connect various electrical and electronic components. In addition, electrical connectors and cables may need to satisfy certain electrical characteristics, such as, impedance or EMI leakage and physical characteristics, such as, size or weight. Also, electrical cables may need to be disconnected from the electrical components using electrical connectors. The invention relates to a new electrical connector.

BRIEF SUMMARY OF THE INVENTION

The invention provides electrical connectors which may be used in high temperature applications. The electrical connectors may need to be disconnected with a predetermined pull force, for example 10 pounds. In the first embodiment, the connector uses one or more magnets to control the amount of pull force. In the second embodiment, the connector uses a beam design to control the amount of pull force.

A cable may attach a first component and a second component. The cable may include a first connector pair. In one embodiment, the first connector pair may be a quick disconnect connector pair. The first connector pair may include a first connector and a second connector. For example, the first component may use the connector to connect and disconnect from the second component when the first component moves away from the second component.

The cable may include wires or conductors. In one embodiment, the cable may include four wires to transmit signals and/or power. In other embodiments, the cable may include fiber optic conductors, or other types of conductors.

In one embodiment, the wires may include a twisted pair of wires. The twisted pair of wires may have a separate shield. The twisted pair of wires with the shield may provide controlled impedance for the wires.

The cable may include a shielding layer. The shielding layer may reduce or eliminate EMI leakage.

The connector may include a backshell. The backshell may shield the connector. The shielding layer may be connected to the backshell. The connection of the shielding layer with the backshell will create shielding along the cable.

The connector pair may be a quick disconnect connector. In one embodiment, the first connector and second connector may disconnect at 4-15 pounds. As noted above, in one embodiment, the connectors may use one or more magnets. In another embodiment, the backshells facilitate the quick disconnect feature. The backshell includes one or more slots. The slots allow a portion of the backshell to become a cantilever beam. The beams are allowed to deflect during disengagement and engagement with the backshell. The deflection can be used to control the amount of disconnect force.

DESCRIPTION OF THE INVENTION

Figure 1:
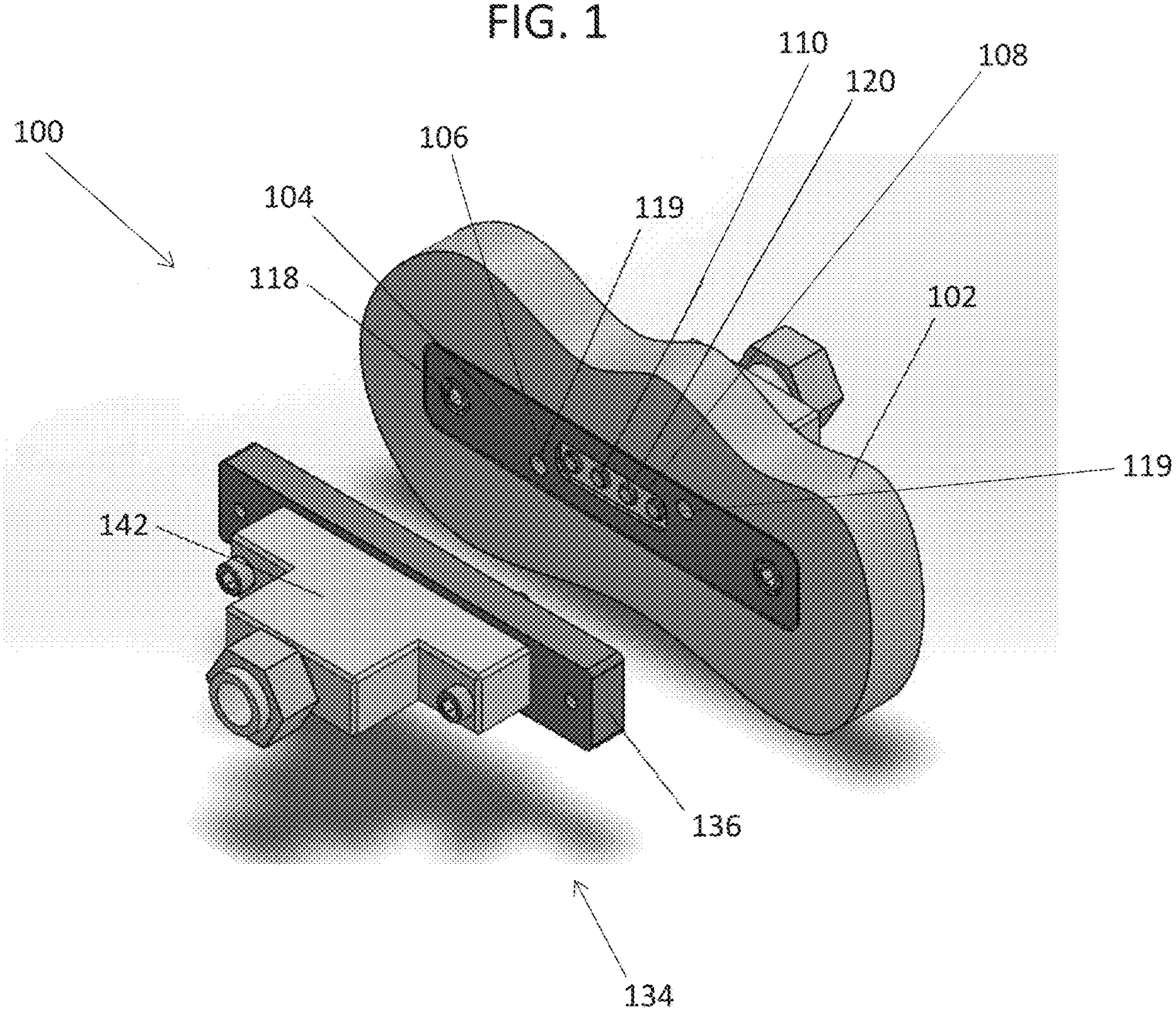
FIG. 1 is a left perspective view of a first embodiment of the connectors.
Figure 2:
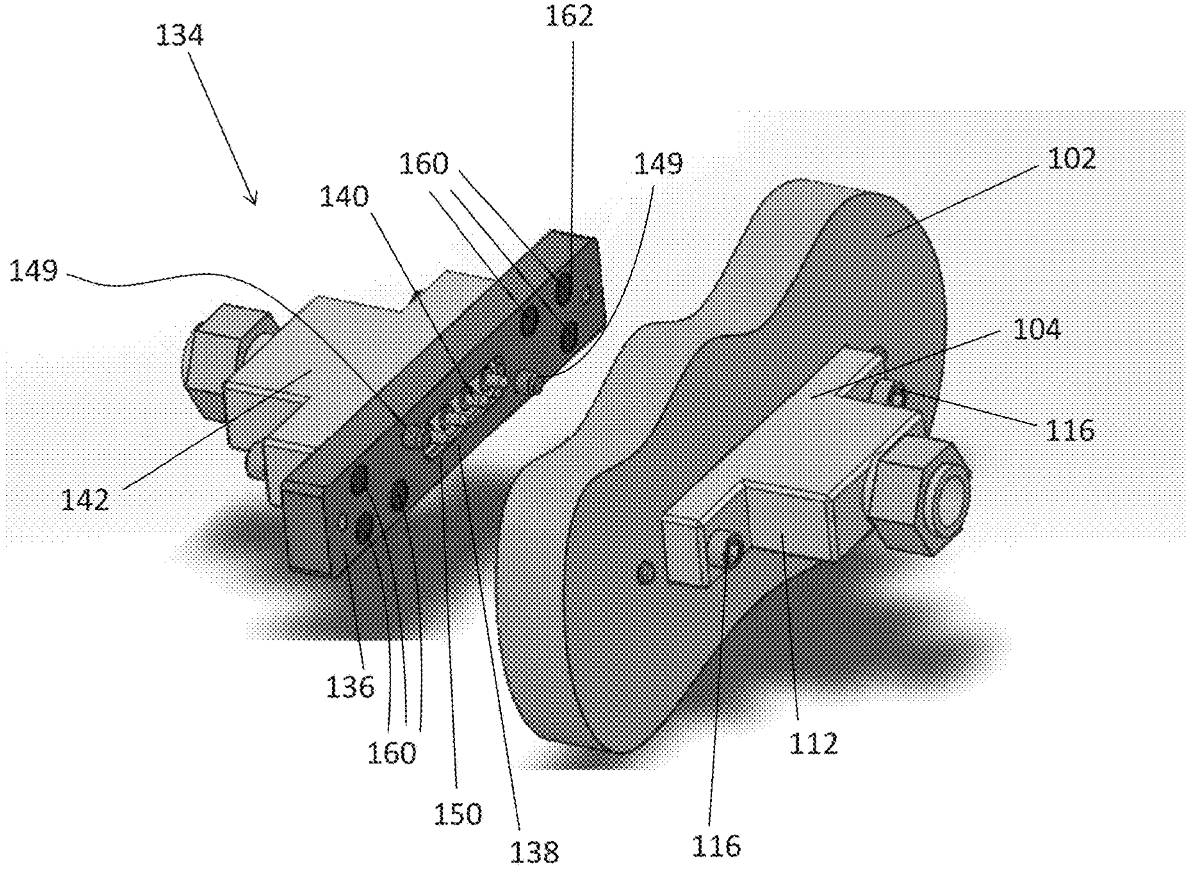
FIG. 2 is a right perspective view of the connectors in FIG. 1.
Figure 3:
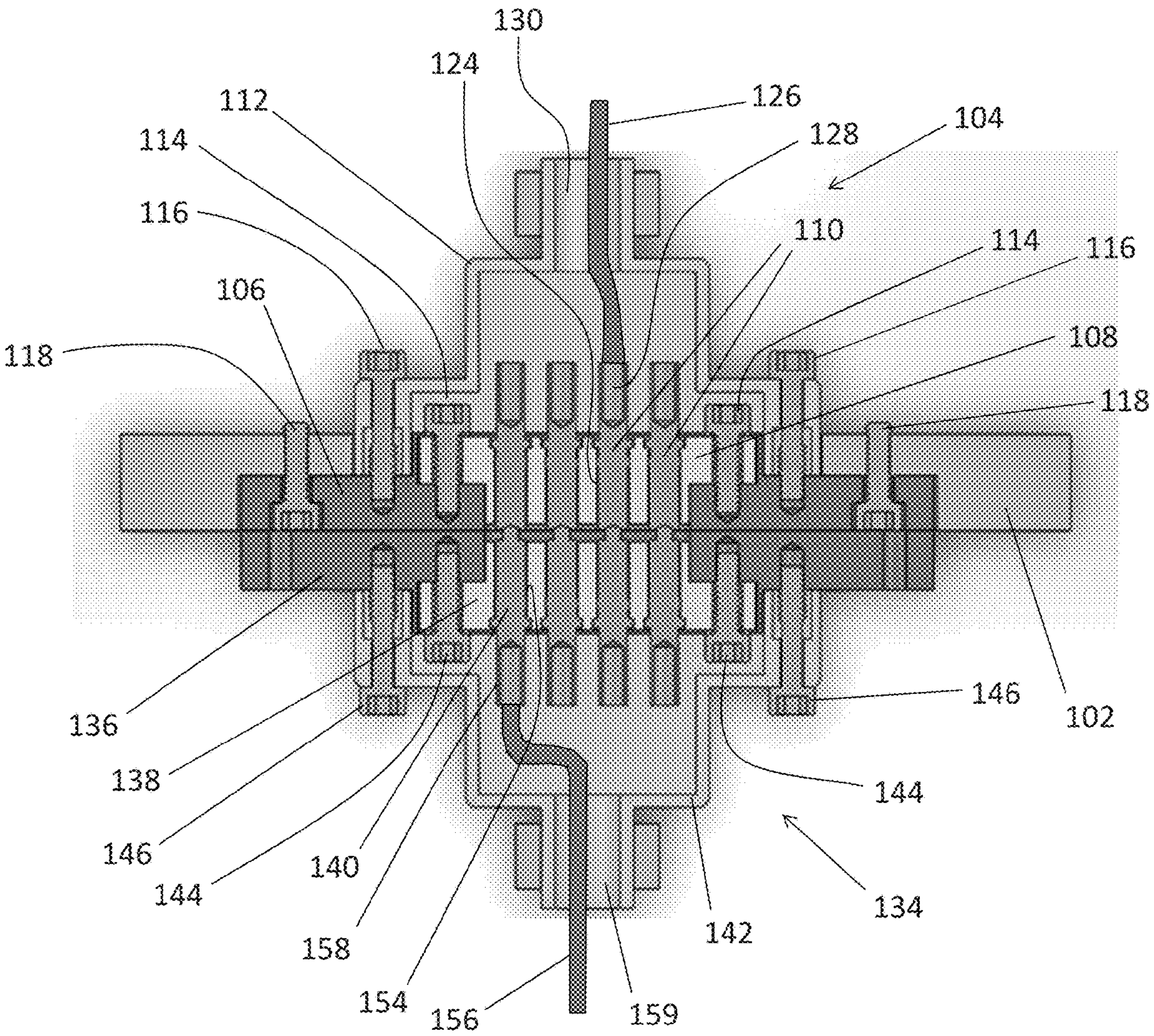
FIG. 3 is a cross-sectional view through the connectors in FIGS. 1 and 2 when the connectors are mated.

Referring to FIGS. 1, 2 and 3, a connector pair 100 is shown mounted to a frame 102. The first connector 104 may be a socket connector or a receptacle connector. In one embodiment, the first connector 104 may be able to withstand 750 degrees C. for up to one hour and have a current rating of 3.5 amps. Referring to FIG. 3, in one embodiment, the first connector 104 may include shell 106, an insulator 108, one or more contacts 110, and a backshell 112.

Referring to FIG. 3, in one embodiment, the first connector 104 may include an attachment system to attach the insulator 108 to the shell 106. In one embodiment, the attachment system may be mounting hardware. In one embodiment, the mounting hardware may be screws 114. In other embodiments, the attachment system may be a mechanical connection, or an adhesive.

Referring to FIG. 3, in one embodiment, the first connector 104 may include an attachment system to attach the backshell 112 to the shell 106. In one embodiment, the attachment system may be mounting hardware. In one embodiment, the mounting hardware may be screws 116. In other embodiments, the attachment system may be a mechanical connection, or an adhesive.

Referring to FIG. 3, in one embodiment, the first connector 104 may include an attachment system to attach the connector 104 to the frame 102. In one embodiment, the attachment system may be mounting hardware. In one embodiment, the mounting hardware may be screws 118. In other embodiments, the attachment system may be a mechanical connection, or an adhesive.

Referring to FIG. 1, in one embodiment, the shell 106 may include an alignment system. In one embodiment, the alignment system may be one or more locating holes 119 in the shell 106. In one embodiment, the shell 106 may include an opening 120 for the insulator 108. In one embodiment, the shell 106 may be made of a material which can withstand a high temperature. In one embodiment, the shell material can withstand a temperature of 750 degrees C. for up to one hour. In one embodiment, the shell material may be martensitic stainless steel 400 series.

Referring to FIG. 3, the insulator 108 may include one or more openings 124 for the contacts 110. In one embodiment, the insulator 108 may be made of a material which can withstand a high temperature. In one embodiment, the insulator can withstand a temperature of 750 degrees C. for up to one hour. In one embodiment, the insulator material may be made of a high temperature ceramic.

Referring to FIG. 3, in one embodiment, the contact 110 may be inserted into opening 124. The contact 110 may be held into position by a press fit, mechanical connection, or other technique. In one embodiment, the contact 110 may be made of a material which can withstand a high temperature. In one embodiment, the contact 110 can withstand a temperature of 750 degrees C. for up to one hour. In one embodiment, the contact may be made of high temperature copper alloy with nickel and gold plating. In one embodiment, the contact 110 may be attached to a wire 126. The wire 126 may be attached by soldering, mechanical connection, or other technique. In one embodiment, the contact 110 may include a solder cup 128.

Referring to FIG. 3, in one embodiment, the backshell 112 may cover the contacts 110 and wires 126 at the rear of the insulator 108. In one embodiment, the backshell 112 may include an opening 130 for the wires 126 to exit the backshell 112. In one embodiment, the backshell 112 may be made of a material which can withstand a high temperature. In one embodiment, the backshell 112 can withstand a temperature of 750 degrees C. for up to one hour. In one embodiment, the backshell 112 made be made of stainless steel 300 series.

In one embodiment, the mounting hardware may be made of a material which can withstand a high temperature. In one embodiment, the mounting hardware can withstand a temperature of 750 degrees C. for up to one hour. In one embodiment, the mounting hardware may be screws 114, 116, 118 and may be made of stainless steel 300 series.

Referring to FIGS. 1, 2 and 3, the second connector 134 may be a plug connector. In one embodiment, the second connector 134 may be able to withstand 150 degrees C. and a current rating of 3.5 amps. Referring to FIG. 3, in one embodiment, the second connector 134 may include a shell 136, an insulator 138, one or more contacts 140, and a backshell 142.

Referring to FIG. 3, in one embodiment, the second connector 134 may include an attachment system to attach the insulator 138 to the shell 136. In one embodiment, the attachment system may be mounting hardware. In one embodiment, the mounting hardware may be screws 144. In other embodiments, the attachment system may be a mechanical connection, or an adhesive.

Referring to FIG. 3, in one embodiment, the second connector 134 may include an attachment system to attach the backshell 142 to the shell 136. In one embodiment, the attachment system may be mounting hardware. In one embodiment, the mounting hardware may be screws 146. In other embodiments, the attachment system may be a mechanical connection, or an adhesive.

Referring to FIG. 2, in one embodiment, the shell 136 may include an alignment system. In one embodiment, the alignment system may be one or more alignment pins 149 on the shell 136. In one embodiment, the shell 136 may include an opening 150 for the insulator 138. In one embodiment, the shell 136 may be made of a material which can withstand a high temperature. In one embodiment, the shell material can withstand a temperature of 150 degrees C. for up to one hour. In one embodiment, the shell 136 may be made of stainless steel 300 series.

Referring to FIG. 3, the insulator 138 may include one or more openings 154 for the contacts 140. In one embodiment, the insulator 138 may be made of a material which can withstand a high temperature. In one embodiment, the insulator can withstand a temperature of 150 degrees C. for up to one hour. In one embodiment, the insulator 138 may be made of high temperature thermal plastic.

Referring to FIG. 3, in one embodiment, the contact 140 may be inserted into opening 154. The contact 140 may be held into position by a press fit, mechanical connection, or other technique. In one embodiment, the contact 140 may be made of a material which can withstand a high temperature. In one embodiment, the contact 140 can withstand a temperature of 150 degrees C. for up to one hour. In one embodiment, the contact 140 may be made of beryllium copper alloy with nickel and gold plating. In one embodiment, the contact may be a POGO pin contact. In one embodiment, the contact 140 may be attached to a wire 156. The wire 156 may be attached by soldering, mechanical connection, or other technique. In one embodiment, the contact 110 may include a solder cup 158.

Referring to FIG. 3, in one embodiment, the backshell 142 may cover the contacts 140 and wires 156 at the rear of the insulator 138. In one embodiment, the backshell 142 may include an opening 159 for the wires 156 to exit the backshell 142. In one embodiment, the backshell 142 may be made of a material which can withstand a high temperature. In one embodiment, the backshell 142 can withstand a temperature of 150 degrees C. for up to one hour. In one embodiment, the backshell 142 may be made of stainless steel 300 series.

In one embodiment, the mounting hardware may be made of a material which can withstand a high temperature. In one embodiment, the mounting hardware can withstand a temperature of 150 degrees C. for up to one hour. In one embodiment, the mounting hardware may be screws 144, 146 and may be made of stainless steel 300 series.

Referring to FIG. 2, in one embodiment, the second connector may include one or more magnets 160. In one embodiment, the magnet 160 may be press-fitted into a hole 162 in the connector shell 136. In one embodiment, the material of the connector shell 136 may be non-magnetic. The material of the opposite connector shell 106 may be made of a material which is attracted to the magnet.

In one embodiment, the magnet 160 may be made of a high temperature material. In one embodiment, the magnet 160 may have a pull force of 0.7 pounds. In one embodiment, the connector may use six magnets 160 which may result in a pull force of 4.2 pounds. In one embodiment, the magnet 160 may be made of nickel-plated neodymium (rare earth) material and have a grade of N35SH. In one embodiment, the magnet 160 may have a flux density of 11,900 G. In one embodiment, the magnet 160 may have a maximum product energy of 278 kJ/m2.

In one embodiment, the locating or alignment pins 149 may have three purposes. First, the alignment pins 149 align the connector pair to be mated together and therefore the proper sequence of contacts are aligned. Second, the alignment pins 149 may extend above the contacts to protect the contact pins 140 from contact when the connector is not mated. Third, the alignment pins 149 may absorb side loads from any direction except the axial direction so that the connector pair will not be disconnected by accidental side forces. In one embodiment, only the axial pull force exceeding the design limit will disconnect the connector pair.

Figure 4:
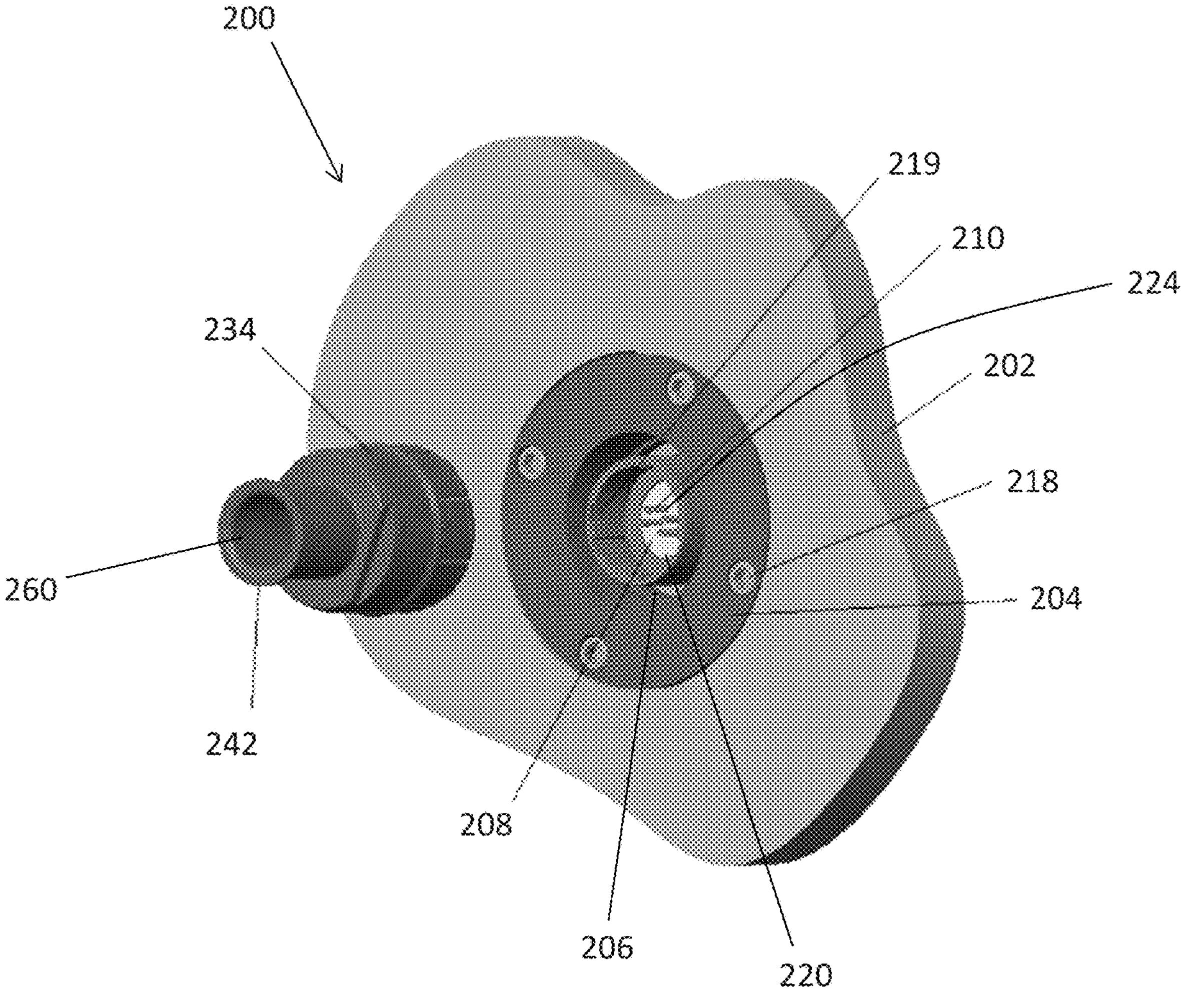
FIG. 4 is a left perspective view of a second embodiment of the connectors.
Figure 5:
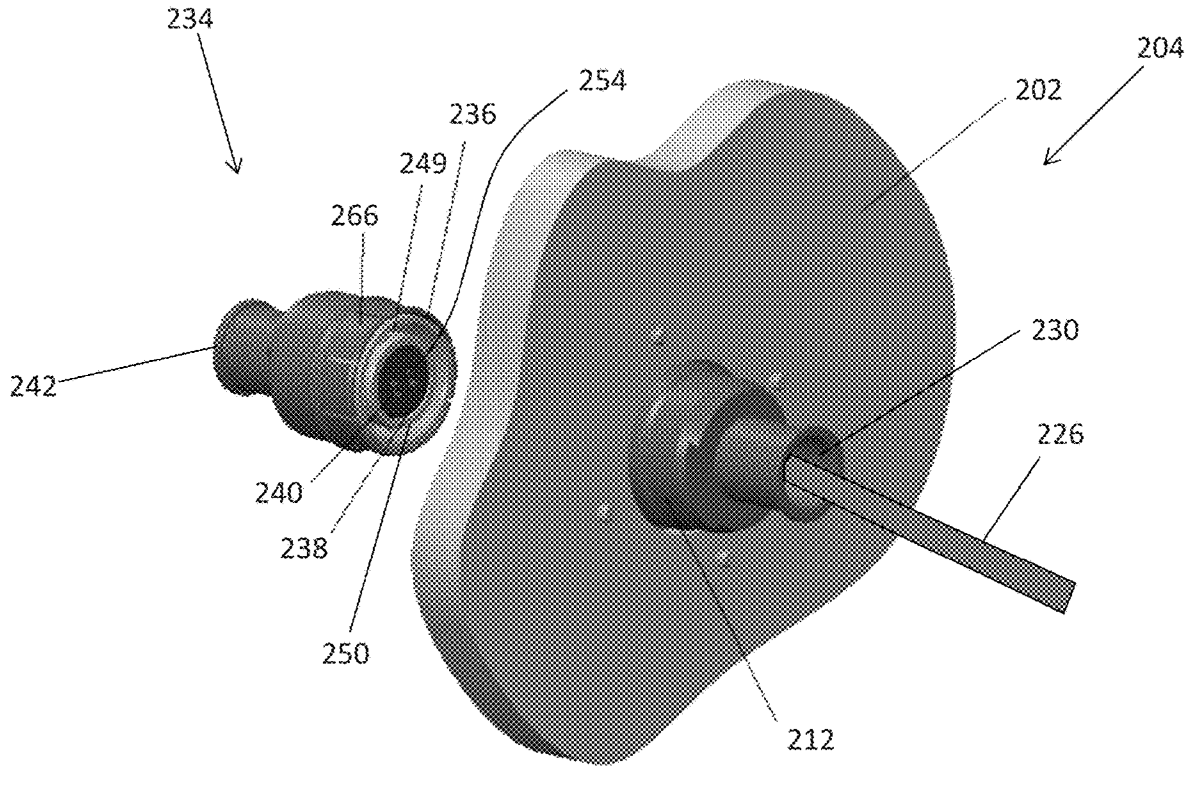
FIG. 5 is a right perspective view of the connectors in FIG. 4.
Figure 6:
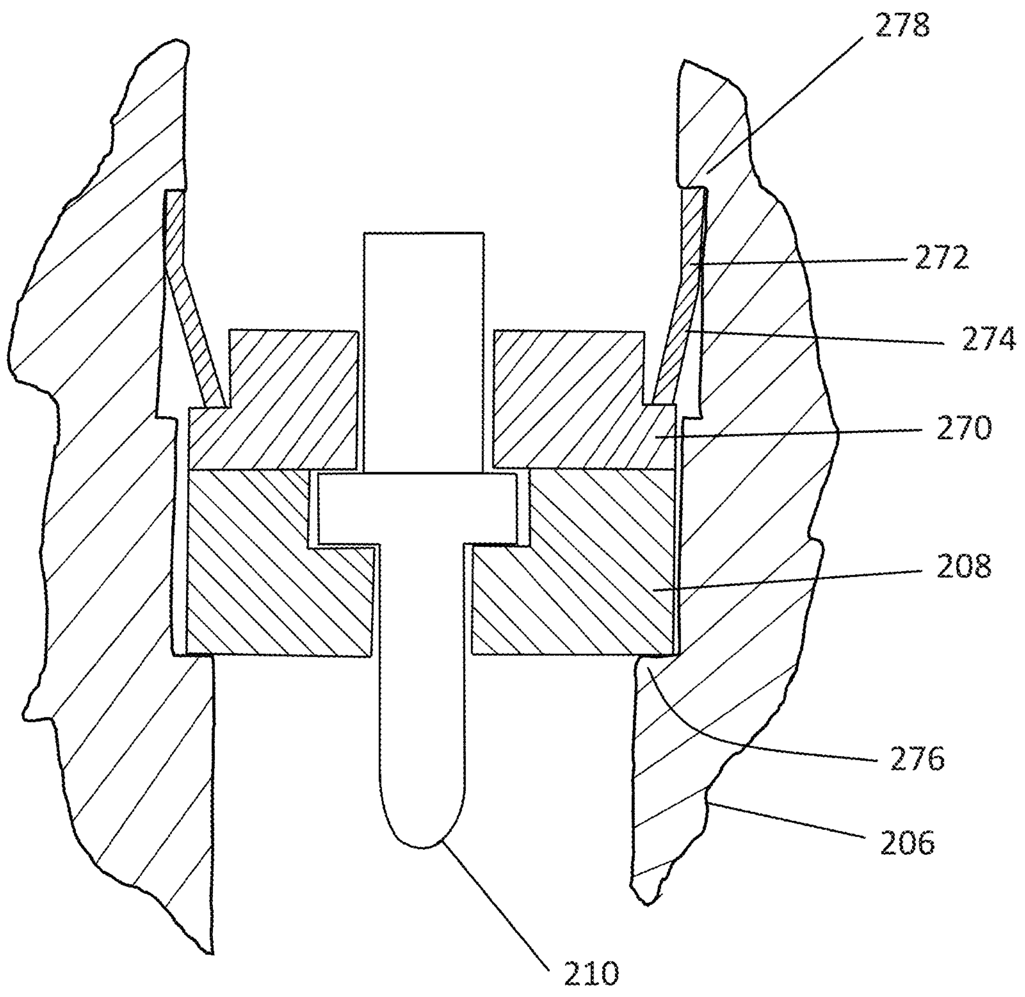
FIG. 6 is a cross-sectional view through a portion of the plug connector in FIGS. 4 and 5.

Referring to FIGS. 4, 5, and 6, a second embodiment of a connector pair 200 is shown mounted to a frame 202. The first connector 204 may be a socket connector or a receptacle connector. In one embodiment, the first connector 204 may be able to withstand 750 degrees C. for up to one hour and have a current rating of 3.5 amps. The first connector 204 may include shell 206, an insulator 208, one or more contacts 210, and a backshell 212.

Referring to FIG. 4, in one embodiment, the first connector 204 may include an attachment system to attach the connector 204 to the frame 202. In one embodiment, the attachment system may be mounting hardware. In one embodiment, the mounting hardware may be screws 218. In other embodiments, the attachment system may be a mechanical connection, or an adhesive. In one embodiment, the mounting hardware may be made of a material which can withstand a high temperature. In one embodiment, the mounting hardware can withstand a temperature of 750 degrees C. for up to one hour. In one embodiment, the mounting hardware may be screws 218 and may be made of stainless steel 300 series.

Referring to FIG. 4, in one embodiment, the shell 206 may include an alignment system. In one embodiment, the alignment system may be one or more alignment keys or slots 219 in the shell 206. In one embodiment, the shell 206 may include an opening 220 for the insulator 208. In one embodiment, the shell 206 may be made of a material which can withstand a high temperature. In one embodiment, the shell material can withstand a temperature of 750 degrees C. for up to one hour. In one embodiment, the shell material may be stainless steel 300 series.

Referring to FIG. 4, the insulator 208 may include one or more openings 224 for the contacts 210. In one embodiment, the insulator 208 may be made of a material which can withstand a high temperature. In one embodiment, the insulator 208 can withstand a temperature of 750 degrees C. for up to one hour. In one embodiment, the insulator 208 may be made of a high temperature ceramic.

Referring to FIG. 4, in one embodiment, the contact 210 may be inserted into opening 224. The contact 210 may be held into position by a press fit, mechanical connection, or other technique. In one embodiment, the contact 210 may be made of a material which can withstand a high temperature. In one embodiment, the contact 210 can withstand a temperature of 750 degrees C. for up to one hour. In one embodiment, the contact may be made of beryllium copper with nickel and gold plating. In one embodiment, the contact 210 may be attached to a wire 226. The wire 226 may be attached by soldering, mechanical connection, or other technique. In one embodiment, the contact 210 may be a crimp type contact.

Referring to FIG. 5, in one embodiment, the backshell 212 may cover the contacts 210 and wires 226 at the rear of the insulator 208. In one embodiment, the backshell 212 may include an opening 230 for the wires 226 to exit the backshell 212. In one embodiment, the backshell 212 may be made of a material which can withstand a high temperature. In one embodiment, the backshell 212 can withstand a temperature of 750 degrees C. for up to one hour. In one embodiment, the backshell 212 made be made of stainless steel 300 series.

Referring to FIGS. 4 and 5, in one embodiment, the second connector 234 may be a plug connector. In one embodiment, the second connector 234 may be able to withstand 150 degrees C. and a current rating of 3.5 amps. The second connector 234 may include a shell 236, an insulator 238, one or more contacts 240, and a backshell 242.

Referring to FIG. 5, in one embodiment, the shell 236 may include an alignment system. In one embodiment, the alignment system may be one or more keys or slots 249 on the shell 236. In one embodiment, the shell 236 may include an opening 250 for the insulator 238. In one embodiment, the shell 236 may be made of a material which can withstand a high temperature. In one embodiment, the shell material can withstand a temperature of 150 degrees C. for up to one hour. In one embodiment, the shell may be made of stainless steel 300 series.

Referring to FIG. 5, the insulator 238 may include one or more openings 254 for the contacts. In one embodiment, the insulator 238 may be made of a material which can withstand a high temperature. In one embodiment, the insulator 238 can withstand a temperature of 150 degrees C. for up to one hour. In one embodiment, the insulator 238 may be made of high temperature thermal plastic.

Referring to FIG. 5, in one embodiment, the contact 240 may be inserted into opening 254. The contact may be held into position by a press fit, mechanical connection, or other technique. In one embodiment, the contact may be made of a material which can withstand a high temperature. In one embodiment, the contact can withstand a temperature of 150 degrees C. for up to one hour. In one embodiment, the contact may be made of beryllium copper alloy with nickel and gold plating. In one embodiment, the contact may be attached to a wire. The wire may be attached by soldering, mechanical connection, or other technique.

Referring to FIGS. 4 and 5, in one embodiment, the backshell 242 may cover the contacts and wires at the rear of the insulator 238. In one embodiment, the backshell 242 may include an opening 260 for the wires to exit the backshell 242. In one embodiment, the backshell 242 may be made of a material which can withstand a high temperature. In one embodiment, the backshell 242 can withstand a temperature of 150 degrees C. for up to one hour. In one embodiment, the backshell 242 made be made of stainless steel 300 series.

Referring to FIG. 5, in one embodiment, the second connector 234 may include a retention member 266. The retention member 266 may retain the second connector 234 to the first connector 204. However, the connectors 204, 234 will separate when the connectors are subjected to a pull force above a specified amount. In one embodiment, the pull force may be 4.2 pounds.

In one embodiment, the first and second connector may include features of the designs shown in U.S. Pat. No. 10,790,619, such as, the shell designs. U.S. Pat. No. 10,790,619 is incorporated herein by reference.

FIG. 6 is a cross-sectional view of one embodiment of the contact 210, insulator 208, and shell 206 of the first connector 204. The contact 210 is located in the insulator 208. The backplate 270 is used to hold the contact 210 in place. The locking clip 272 includes one or more bent tabs 274 to hold the backplate 270 in place. The front shoulder 276 of the shell 206 prevents the insulator 208 from moving forward. The groove or shoulder 278 in the shell 206 holds the locking clip 272 to prevent the backplate 270 and insulator 208 from moving backward.

Referring to FIG. 6, in one embodiment, the shell 206 may be made of stainless steel. In one embodiment, the insulator 208 may be made of ceramic. In one embodiment, the backplate 270 may be made of ceramic. In one embodiment, the locking clip 272 may be made of beryllium copper.

Figure 7:
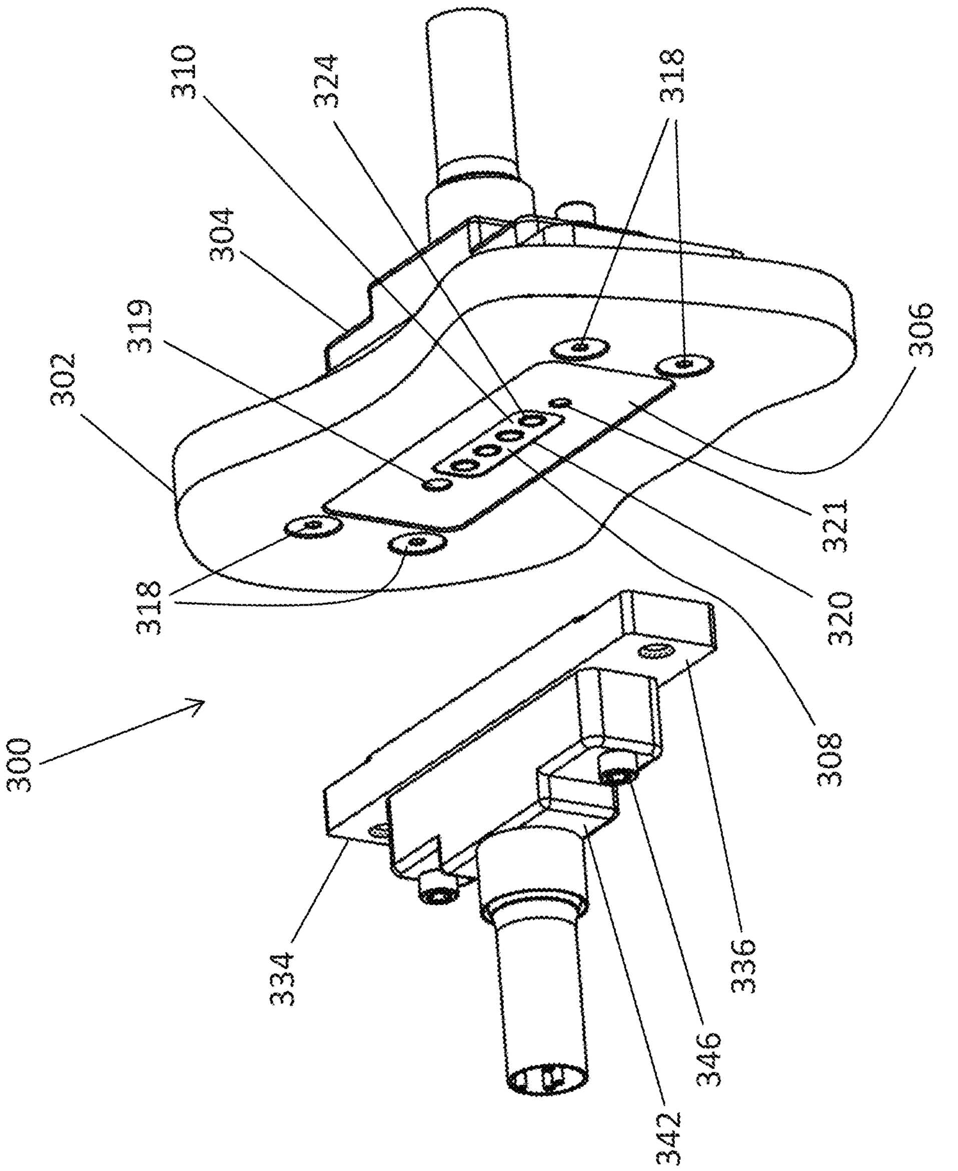
FIG. 7 is a left perspective view of a third embodiment.
Figure 8:
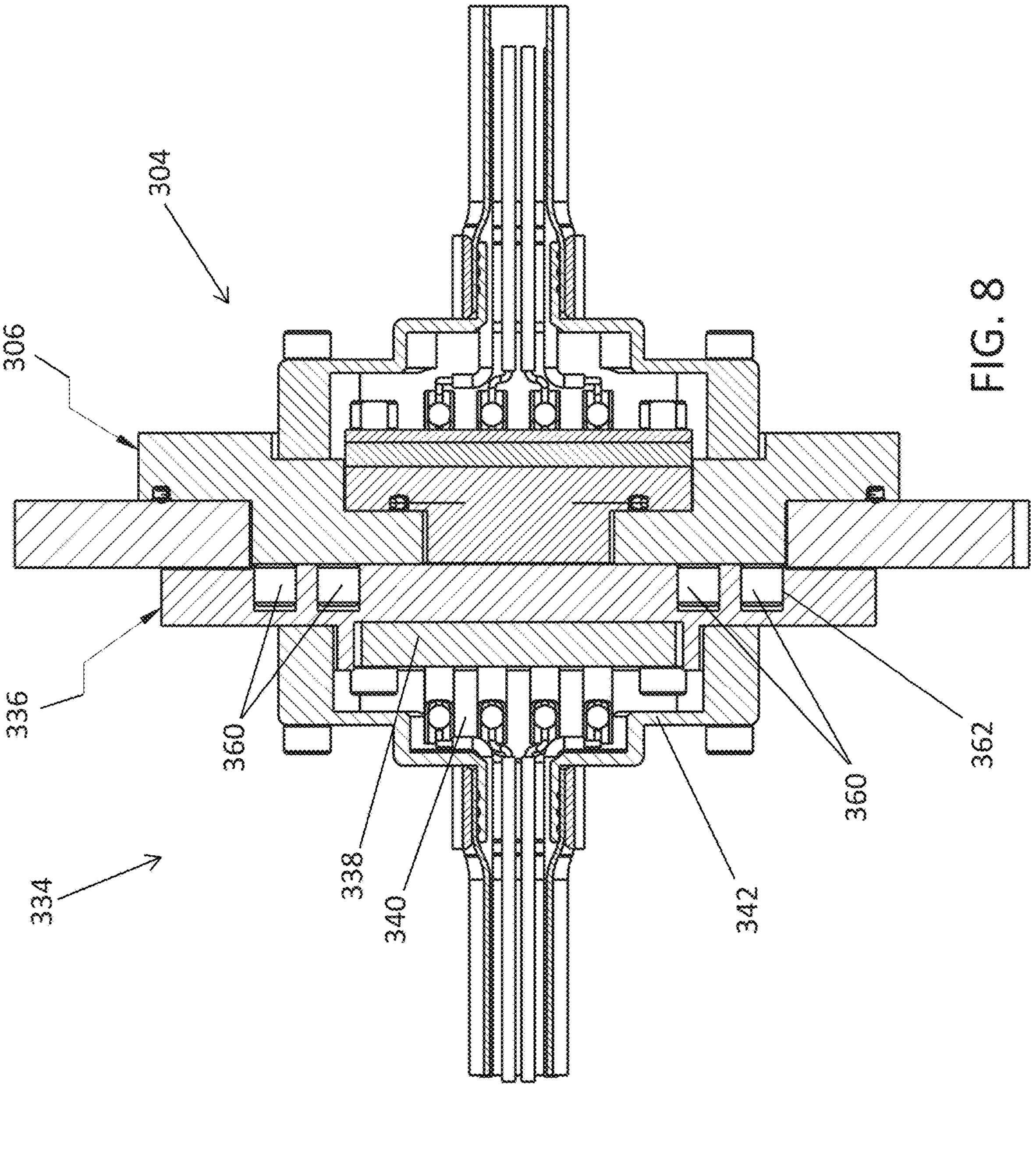
FIG. 8 is a cross-sectional view through the connectors in FIG. 7 when the connectors are mated.
Figure 9:
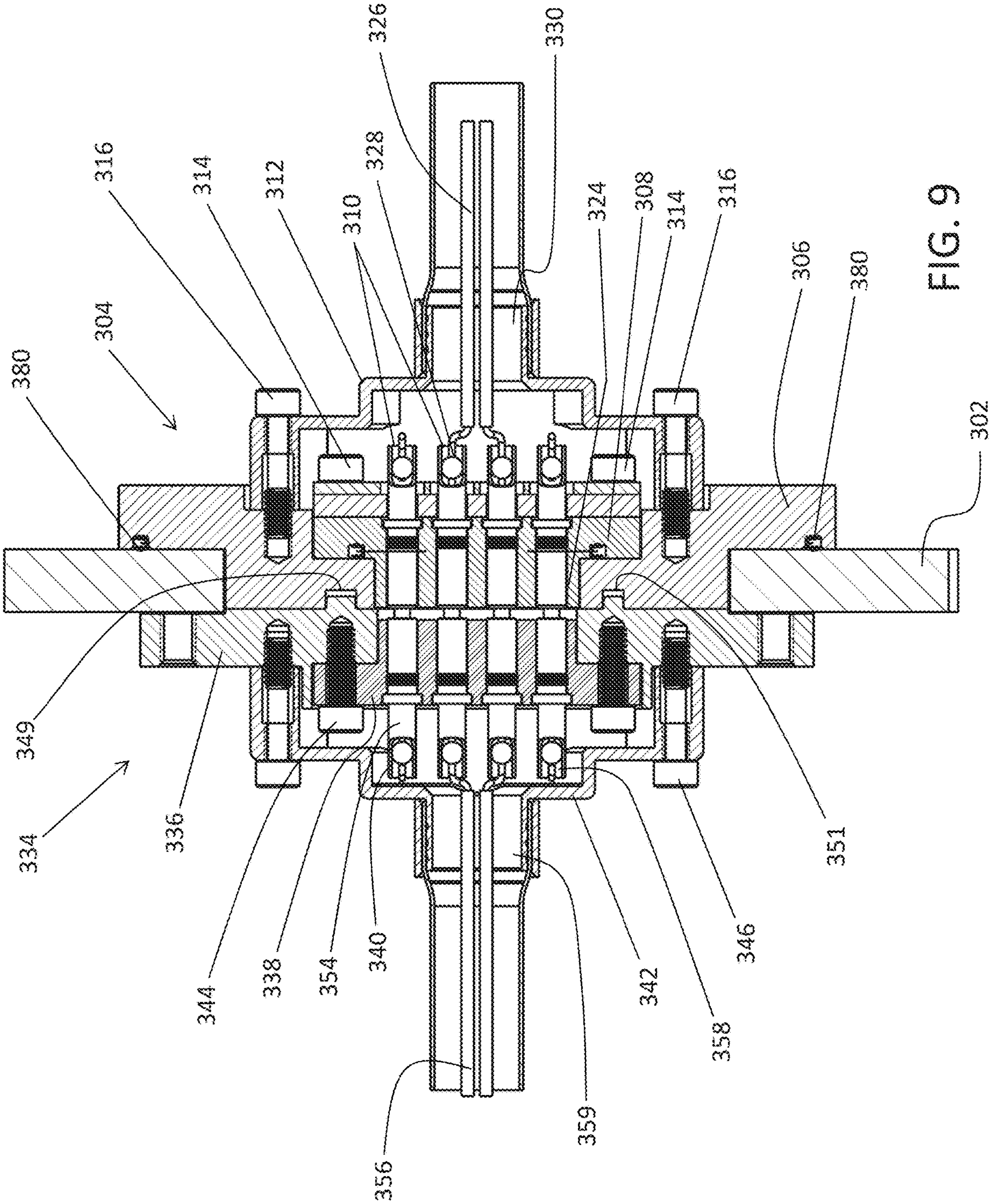
FIG. 9 is another cross-sectional view through the connectors in FIG. 7 when the connectors are mated.

Referring to FIGS. 7-15, a third embodiment of a connector pair 300 is shown. Referring to FIG. 7, a connector pair 300 is shown mounted to a frame 302. The first connector 304 may be a socket connector or a receptacle connector. In one embodiment, the first connector 304 may be able to withstand 750 degrees C. for up to one hour and have a current rating of 3.5 amps. Referring to FIG. 9, in one embodiment, the first connector 304 may include shell 306, an insulator 308, one or more contacts 310, and a backshell 312.

Referring to FIG. 9, in one embodiment, the first connector 304 may include an attachment system to attach the insulator 308 to the shell 306. In one embodiment, the attachment system may be mounting hardware. In one embodiment, the mounting hardware may be screws 314. In other embodiments, the attachment system may be a mechanical connection, or an adhesive.

Referring to FIG. 9, in one embodiment, the first connector 304 may include an attachment system to attach the backshell 312 to the shell 306. In one embodiment, the attachment system may be mounting hardware. In one embodiment, the mounting hardware may be screws 316. In other embodiments, the attachment system may be a mechanical connection, or an adhesive.

Referring to FIGS. 7 and 9, in one embodiment, the first connector 304 may include an attachment system to attach the connector 304 to the frame 302. In one embodiment, the attachment system may be mounting hardware. In one embodiment, the mounting hardware may be screws 318. In other embodiments, the attachment system may be a mechanical connection, or an adhesive.

In one embodiment, the mounting hardware may be made of a material which can withstand a high temperature. In one embodiment, the mounting hardware can withstand a temperature of 750 degrees C. for up to one hour. In one embodiment, the mounting hardware may be screws 314, 316, 318 and may be made of stainless steel 300 series.

Figure 14:
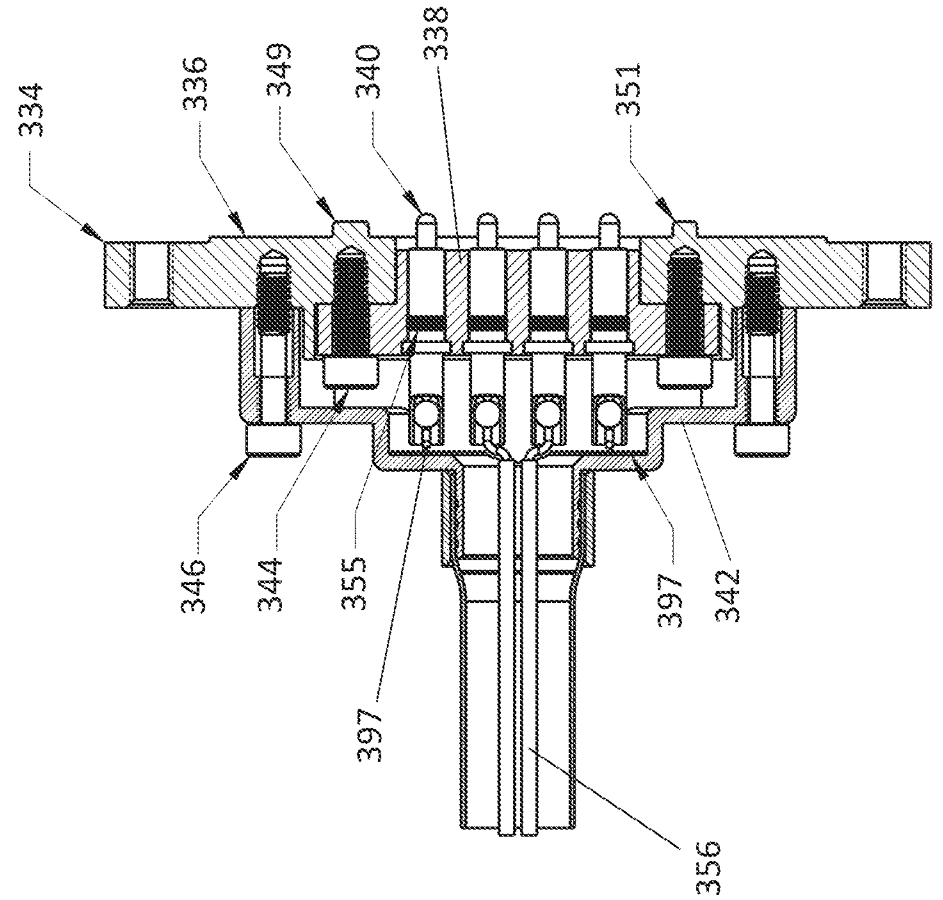
FIG. 14 is a cross-sectional view of the connector in FIG. 13.
Figure 15:
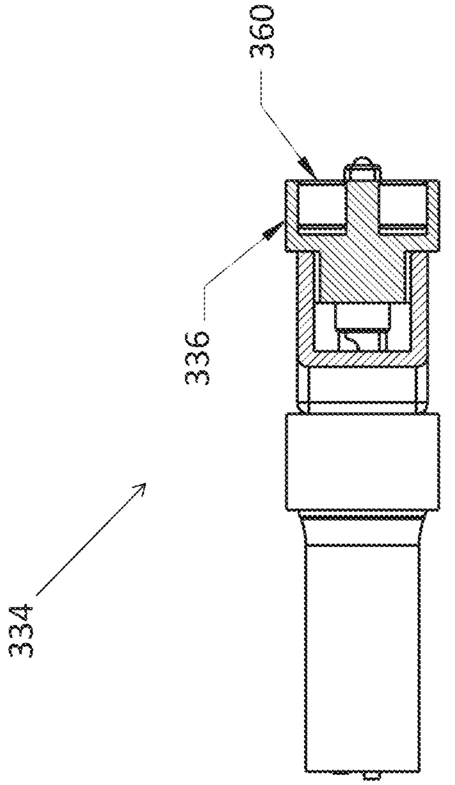
FIG. 15 is another cross-sectional view of the connector in FIG. 13.

Referring to FIG. 7, in one embodiment, the shell 306 may include an alignment system. In one embodiment, the alignment system may be one or more locating holes 319, 321 in the shell 306. In one embodiment, one of the locating holes 319 may be large and the other locating hole 321 may be small. Referring to FIG. 14 and as will be discussed later, the second connector includes a large pin 349 and small pin 351 which will engage the large and small locating holes to achieve the proper orientation of the connectors.

Referring to FIG. 7, in one embodiment, the shell 306 may include an opening 320 for the insulator 308. In one embodiment, the shell 306 may be made of a material which can withstand a high temperature. In one embodiment, the shell material can withstand a temperature of 750 degrees C. for up to one hour. In one embodiment, the shell material may be martensitic stainless steel 400 series.

Referring to FIGS. 7 and 9, the insulator 308 may include one or more openings 324 for the contacts 310. In one embodiment, the insulator 308 may be made of a material which can withstand a high temperature. In one embodiment, the insulator can withstand a temperature of 750 degrees C. for up to one hour. In one embodiment, the insulator material may be made of a high temperature ceramic.

Figure 12:
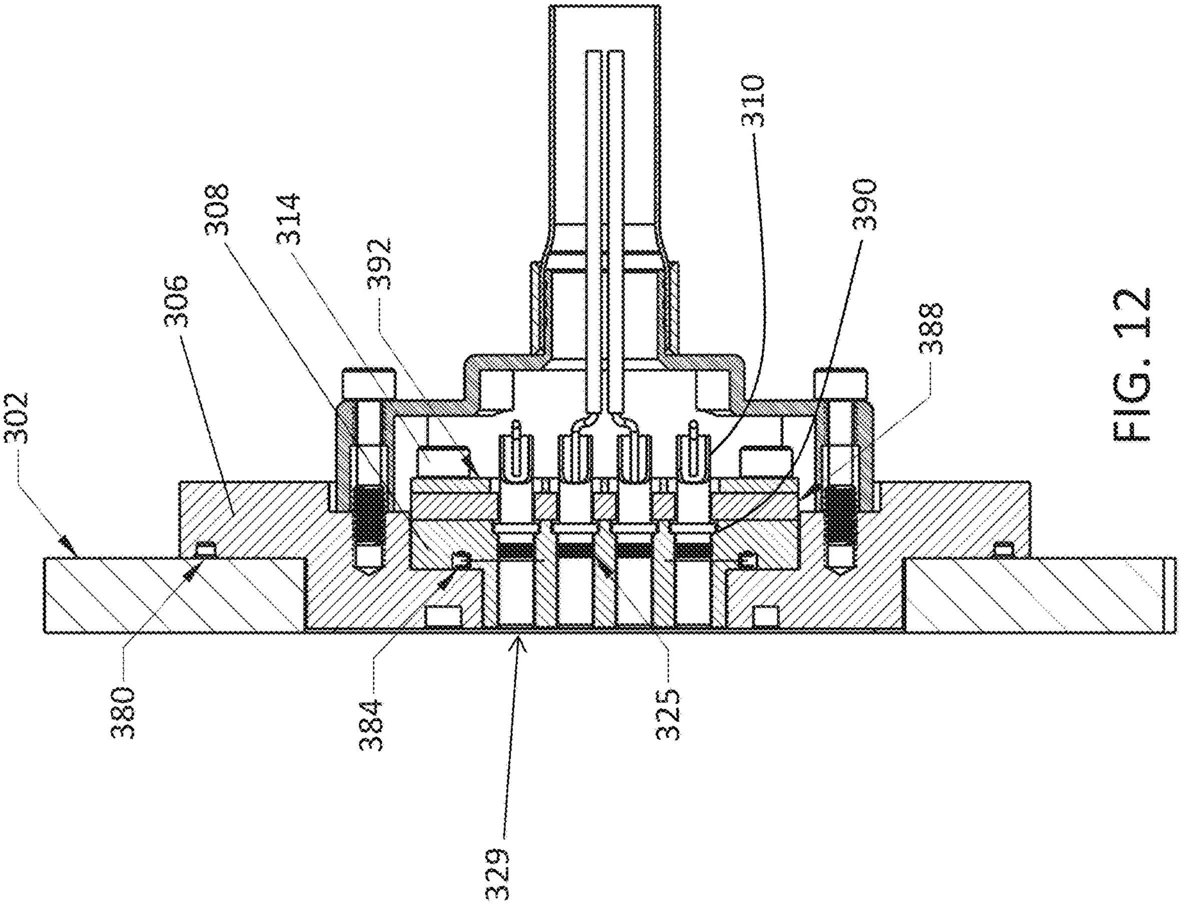
FIG. 12 is a cross-sectional view of one of the connectors in FIG. 7.

Referring to FIGS. 7 and 9, in one embodiment, the contact 310 may be inserted into opening 324. The contact 310 may be held into position by a press-fit, mechanical connection, or other technique. Referring to FIG. 12, in one embodiment, the contact 310 may have a machined surface 325 which may enhance the press-fit and may also prevent leakage of air between the contact 310 and the insulator 308. In one embodiment, the machined surface 325 may be a knurled surface. In one embodiment, the contact 310 may be made of a material which can withstand a high temperature. In one embodiment, the contact 310 can withstand a temperature of 750 degrees C. for up to one hour. In one embodiment, the contact may be made of high temperature copper alloy with nickel and gold plating. In one embodiment, the contact 310 may be attached to a wire 326. The wire 326 may be attached by soldering, mechanical connection, or other technique. In one embodiment, the contact 310 may include a solder cup 328. Referring to FIG. 12, in one embodiment, the contact 310 may have a concave surface 329 at the end face which faces the mating contact from the second connector.

Referring to FIG. 9, in one embodiment, the backshell 312 may cover the contacts 310 and wires 326 at the rear of the insulator 308. In one embodiment, the backshell 312 may include an opening 330 for the wires 326 to exit the backshell 312. In one embodiment, the backshell 312 may be made of a material which can withstand a high temperature. In one embodiment, the backshell 312 can withstand a temperature of 750 degrees C. for up to one hour. In one embodiment, the backshell 312 made be made of stainless steel 300 series.

Figure 10:
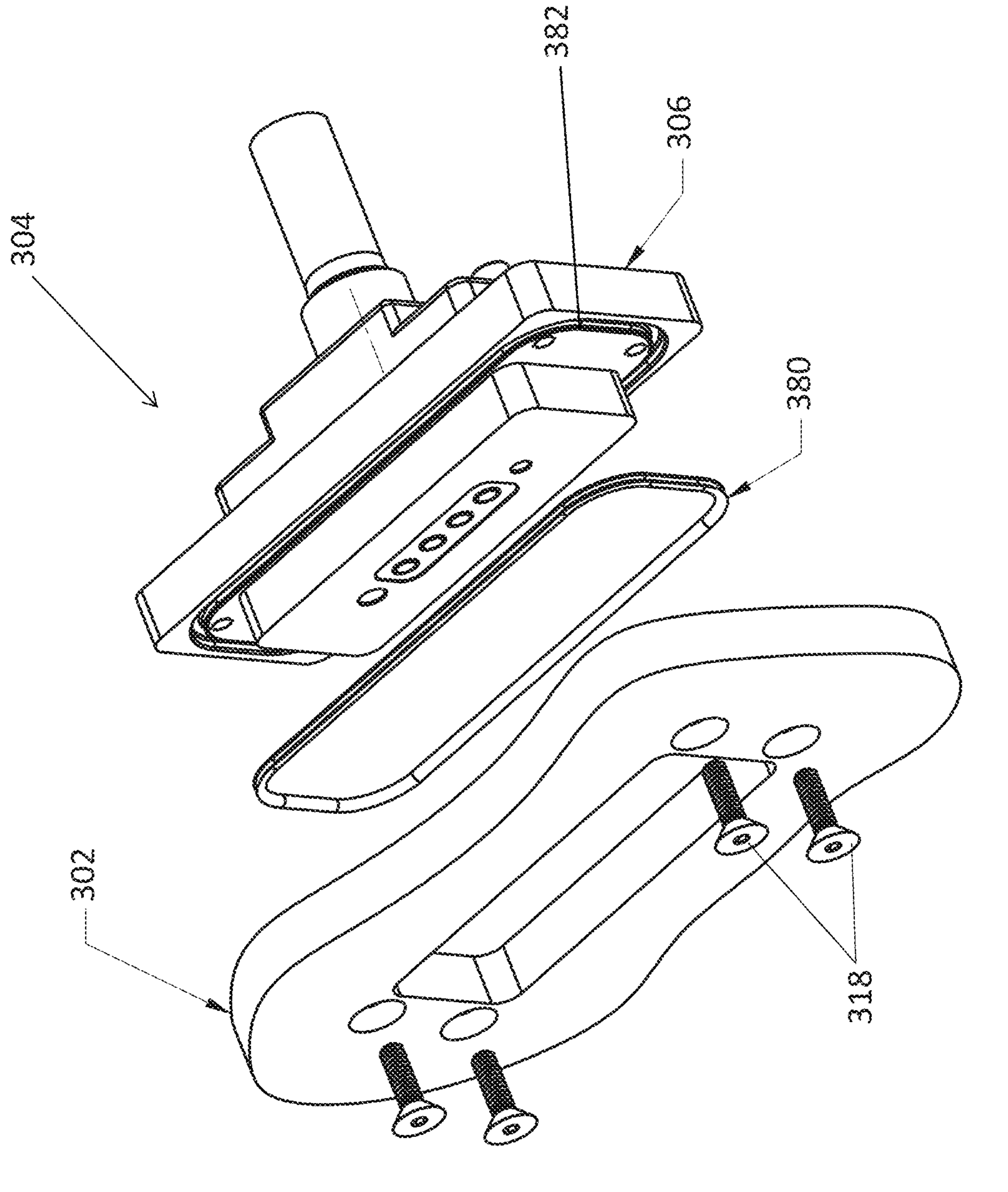
FIG. 10 is an exploded view of one of the connectors in FIG. 7.

Referring to FIG. 10, in one embodiment, the first connector 304 may include a shell seal 380. In one embodiment, the seal 380 may prevent air leakage between the frame 302 and the shell 306. The temperature on the side of the frame 302 opposite the connector 304 may be a high temperature. In one example, the temperature may be 750 degrees C. or more. In one embodiment, the seal 380 made be made of metal. In one embodiment, the seal 380 may be made of stainless steel. In other embodiments, the seal 380 may be made of other high temperature materials. In one embodiment, the seal 380 may have a C-shape. In other embodiments, the seal 380 can have other cross-sections.

In one embodiment, the shell 306 may include a groove 382. The seal 380 may be positioned in the groove 382.

Figure 11:
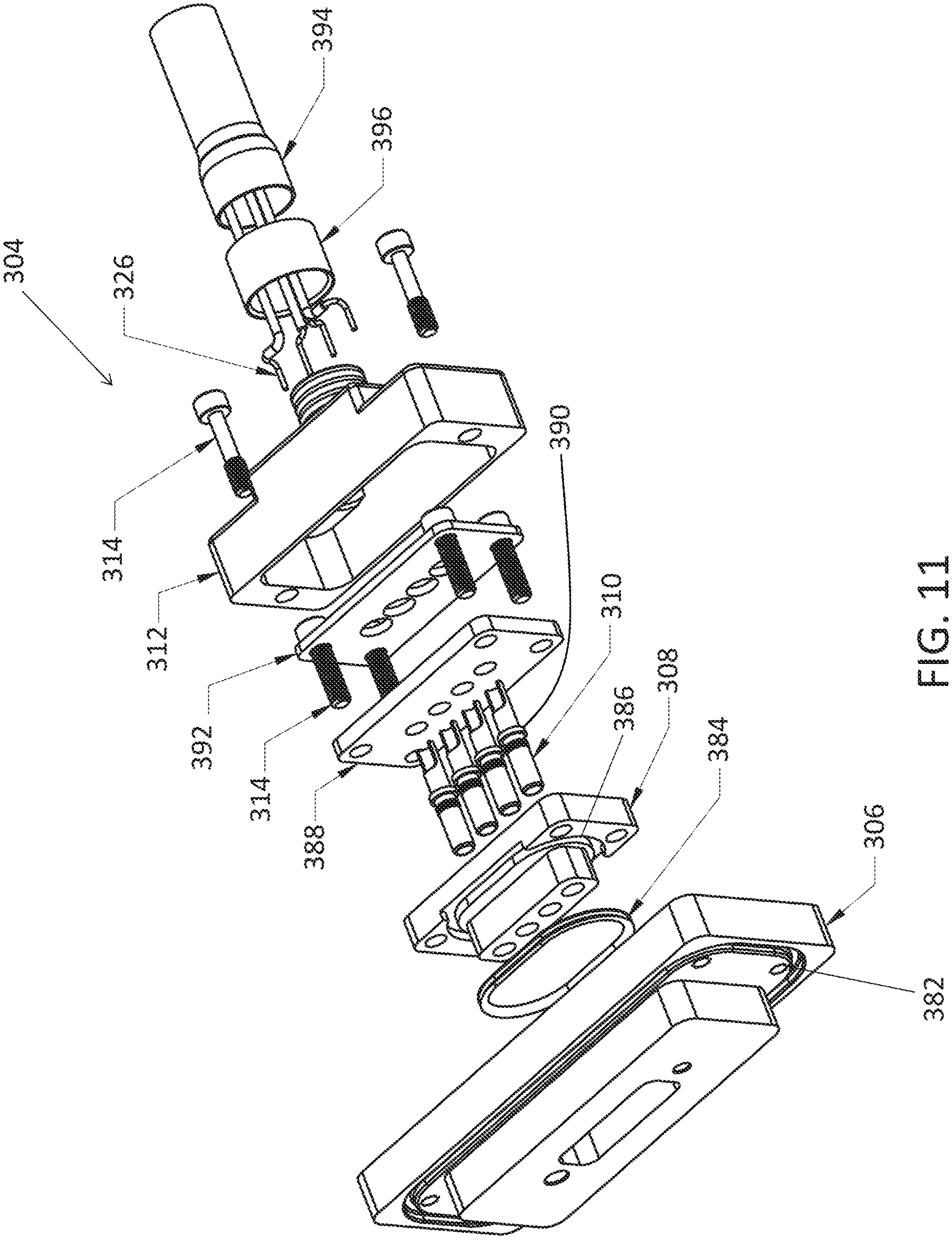
FIG. 11 is another exploded view of the connector in FIG. 10.

Referring to FIG. 11, in one embodiment, the first connector 304 may include an insulator seal 384. In one embodiment, the seal 384 may prevent air leakage between the insulator 308 and the shell 306. The temperature on the side of the frame 302 opposite the connector 304 may be a high temperature. In one example, the temperature may be 750 degrees C. or more. In one embodiment, the seal 384 made be made of metal. In one embodiment, the seal 384 may be made of stainless steel. In other embodiments, the seal 384 may be made of other high temperature materials. In one embodiment, the seal 384 may have a C-shape. In other embodiments, the seal 384 can have other cross-sections.

In one embodiment, the insulator 308 may include a groove 386. The seal 384 may be positioned in the groove 386.

Referring to FIG. 11, in one embodiment, the first connector 304 may include a contact backplate 388. The contact backplate 388 prevents the contact 310 from backing out by engaging the flange 390 on the contact 310 as shown in FIG. 12. In one embodiment, the contact backplate 388 may be made of a ceramic material.

Referring to FIG. 11, in one embodiment, the first connector 304 may include a pressure backplate 392. The pressure backplate 392 may provide uniform pressure for the compression of the insulator seal 384. The screws 314 may apply the force to the backplate 392.

Referring to FIG. 11, in one embodiment, the cable may include an EMI shielding jacket 394 and a shielding jacket locking barrel 396.

Referring to FIGS. 7, 8 and 9, the second connector 334 may be a plug connector. In one embodiment, the second connector 334 may be able to withstand 150 degrees C. and a current rating of 3.5 amps. Referring to FIG. 9, in one embodiment, the second connector 334 may include a shell 336, an insulator 338, one or more contacts 340, and a backshell 342.

Referring to FIG. 9, in one embodiment, the second connector 334 may include an attachment system to attach the insulator 338 to the shell 336. In one embodiment, the attachment system may be mounting hardware. In one embodiment, the mounting hardware may be screws 344. In other embodiments, the attachment system may be a mechanical connection, or an adhesive.

Referring to FIG. 9, in one embodiment, the second connector 334 may include an attachment system to attach the backshell 342 to the shell 336. In one embodiment, the attachment system may be mounting hardware. In one embodiment, the mounting hardware may be screws 346. In other embodiments, the attachment system may be a mechanical connection, or an adhesive.

Figure 13:
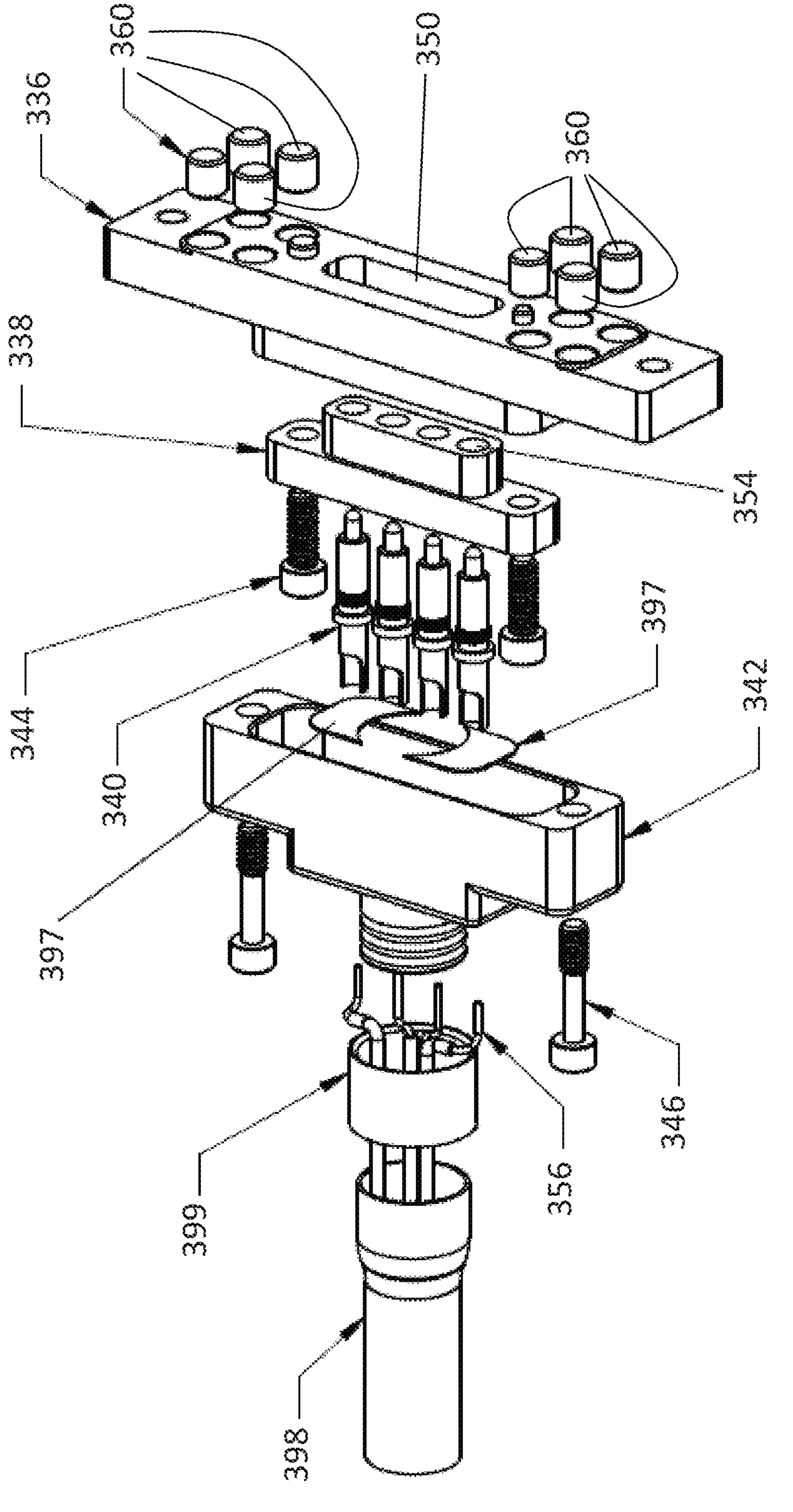
FIG. 13 is an exploded view of one of the connectors in FIG. 7.

In one embodiment, the mounting hardware may be made of a material which can withstand a high temperature. In one embodiment, the mounting hardware can withstand a temperature of 150 degrees C. for up to one hour. In one embodiment, the mounting hardware may be screws 344, 346 and may be made of stainless steel 300 series Referring to FIGS. 9 and 14, in one embodiment, the shell 336 may include an alignment system. In one embodiment, the alignment system may be one or more alignment pins 349, 351 on the shell 336. Referring to FIG. 13, in one embodiment, the shell 336 may include an opening 350 for the insulator 338. In one embodiment, the shell 336 may be made of a material which can withstand a high temperature. In one embodiment, the shell material can withstand a temperature of 150 degrees C. for up to one hour. In one embodiment, the shell 336 may be made of stainless steel 300 series.

Referring to FIG. 13, the insulator 338 may include one or more openings 354 for the contacts 340. In one embodiment, the insulator 338 may be made of a material which can withstand a high temperature. In one embodiment, the insulator 338 can withstand a temperature of 150 degrees C. for up to one hour. In one embodiment, the insulator 338 may be made of high temperature thermal plastic.

Referring to FIG. 9, in one embodiment, the contact 340 may be inserted into opening 354. The contact 340 may be held into position by a press fit, mechanical connection, or other technique. Referring to FIG. 14, in one embodiment, the contact 340 may have a machined surface 355 which may enhance the press-fit and may also prevent leakage of air between the contact 340 and the insulator 338. In one embodiment, the machined surface 355 may be a knurled surface. In one embodiment, the contact 340 may be made of a material which can withstand a high temperature. In one embodiment, the contact 340 can withstand a temperature of 150 degrees C. for up to one hour. In one embodiment, the contact 340 may be made of beryllium copper alloy with nickel and gold plating. In one embodiment, the contact 340 may be a POGO pin contact. In one embodiment, the contact 340 may be attached to a wire 356. The wire 356 may be attached by soldering, mechanical connection, or other technique. Referring to FIG. 9, in one embodiment, the contact 340 may include a solder cup 358.

Referring to FIG. 9, in one embodiment, the backshell 342 may cover the contacts 340 and wires 356 at the rear of the insulator 338. In one embodiment, the backshell 342 may include an opening 359 for the wires 356 to exit the backshell 342. In one embodiment, the backshell 342 may be made of a material which can withstand a high temperature. In one embodiment, the backshell 342 can withstand a temperature of 150 degrees C. for up to one hour. In one embodiment, the backshell 342 may be made of stainless steel 300 series.

Referring to FIG. 8, in one embodiment, the second connector 334 may include one or more magnets 360. In one embodiment, the magnet 360 may be press-fitted into a hole 362 in the connector shell 336. In one embodiment, the material of the connector shell 336 may be non-magnetic. The material of the opposite connector shell 306 may be made of a material which is attracted to the magnet.

In one embodiment, the magnet 360 may be made of a high temperature material. In one embodiment, the magnet 360 may have a pull force of 0.7 pounds. In one embodiment, the connector may use eight magnets 360 which may result in a pull force of 5.6 pounds. In one embodiment, the magnet 360 may be made of nickel-plated neodymium (rare earth) material and have a grade of N35SH. In one embodiment, the magnet 360 may have a flux density of 11,900 G. In one embodiment, the magnet 360 may have a maximum product energy of 278 kJ/m2.

In one embodiment, the locating or alignment pins 349 may have three purposes. First, the alignment pins 349 align the connector pair to be mated together and therefore the proper sequence of contacts are aligned. Second, the alignment pins 349 may extend above the contacts 340 to protect the contacts 340 from contact when the connector is not mated. Third, the alignment pins 349 may absorb side loads from any direction except the axial direction so that the connector pair will not be disconnected by accidental side forces. In one embodiment, only the axial pull force exceeding the design limit will disconnect the connector pair.

Referring to FIGS. 13 and 14, in one embodiment, the second connector 334 may include an insulator 397 to insulate the contacts 340 and wires 356 from the backshell 342. In one embodiment, the insulator 397 is made from a non-condcutive material. In one embodiment, the insulator 397 is made from Kapton material.

Referring to FIG. 13, in one embodiment, the cable may include an EMI shielding jacket 398 and a shielding jacket locking barrel 399.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. An electrical connector comprising:
- electrical contacts, the electrical contacts conduct electrical signals;
- an insulator, the insulator holds the electrical contacts;
- a shell, the shell includes a magnet to attach to a mating connector,
- an insulator seal, the insulator seal is between the insulator and the shell; and
- a pressure backplate, the pressure backplate applies force to compress the insulator seal.

2. An electrical connector as in claim 1 wherein the connector disconnects from the mating connector at a disconnect force of less than 10 pounds.

3. An electrical connector as in claim 1 further comprising a shell seal on the exterior face of the shell wherein the shell seal will engage a mounting surface.

4. An electrical connector as in claim 3 wherein the shell seal is made of metal.

5. An electrical connector as in claim 4 wherein the shell seal has a C-shaped cross-section.

6. An electrical connector as in claim 1 wherein the insulator seal is made of metal.

7. An electrical connector as in claim 6 wherein the insulator seal has a C-shaped cross-section.

8. An electrical connector as in claim 1 further comprising hardware to attach the pressure backplate to the shell.

9. An electrical connector as in claim 1 wherein the electrical connector can withstand 750 degrees C. for 1 hour.

10. An electrical connector as in claim 1 wherein the contacts have a machined surface to prevent air leakage between the contact and the insulator.

11. An electrical connector as in claim 1 further comprising a backplate to retain the contacts in the insulator, wherein the backplate is made of ceramic.

12. An electrical connector as in claim 1 further comprising a second magnet to attach to a mating connector.

13. An electrical connector as in claim 1 further comprising a backshell to shield the electrical contacts.

14. An electrical connector as in claim 1 further comprising an alignment feature to properly align the connector with a mating connector.

15. An electrical connector as in claim 1 further comprising hardware to attach the insulator to the shell.

16. An electrical connector as in claim 1 further comprising a mating connector, the mating connector includes one or more pogo pin contacts.

17. An electrical connector comprising:
- an electrical contact, the electrical contact conducts an electrical signal;
- an insulator, the insulator holds the electrical contact;
- a backplate, the backplate is located behind the insulator,
- a locking clip, the locking clip holds the backplate in position; and
- a shell, the shell includes an opening which includes the insulator, the contact, the backplate, and the locking clip.

18. An electrical connector as in claim 17 wherein the insulator and the backplate are made of non-electrically conductive materials.

19. An electrical connector as in claim 17 wherein the locking clip includes one or more tabs.

20. An electrical connector as in claim 17 wherein the shell includes one or more shoulders.

* * * * *